United States Patent [19]

Krejci

[11] 4,287,974
[45] Sep. 8, 1981

[54] CLUTCH ASSEMBLY FOR VENDING CONTROL SYSTEM

[75] Inventor: Wayne Krejci, Chesterfield, Mo.

[73] Assignee: Coin Acceptors, Inc., St. Louis, Mo.

[21] Appl. No.: 85,583

[22] Filed: Oct. 17, 1979

[51] Int. Cl.³ ............................ F16D 7/02; F16P 7/02
[52] U.S. Cl. .................................. 192/56 R; 64/29;
64/30 E; 192/150; 221/21
[58] Field of Search .................. 192/56 R, 56 L, 150,
192/74; 64/29, 30 E; 221/21

[56] References Cited

U.S. PATENT DOCUMENTS

| 2,637,987 | 5/1953 | Hill et al. | 192/56 R |
| 2,879,874 | 3/1959 | Malmros | 192/150 |
| 3,132,730 | 5/1964 | Dahlstrand et al. | 192/56 L |
| 3,696,775 | 10/1972 | Markart | 64/29 X |
| 3,802,222 | 4/1974 | Weber | 64/29 X |
| 3,998,357 | 12/1976 | Levasseur | 221/21 |

*Primary Examiner*—Rodney H. Bonck

*Attorney, Agent, or Firm*—Cohn, Powell & Hind

[57] ABSTRACT

A torque-limiting clutch and switch assembly for a vending control system including a motor cam for driving a load, a shaft driven by the motor, a motor cam connected to the shaft and having a cross-sectional rotative end bearing portion extending coaxially of the shaft, a load cam having a recess for rotatively receiving the rotative end bearing portion of the motor cam and providing the only rotative bearing support for the motor cam and the shaft on the load cam, and a clutch spring carried by and engaging the motor cam for turning the load cam with the motor cam. The motor cam includes an axially raised portion for actuating the switch assembly, and an intermediate portion between the raised portion and rotative end bearing portion carrying the clutch spring. The load cam includes a cup-shaped section having an end wall in which the recess is located, the recess communicates with the cup-shaped section of the load cam overfitting the motor cam without physical engagement.

1 Claim, 7 Drawing Figures

CLUTCH ASSEMBLY FOR VENDING CONTROL SYSTEM

BACKGROUND OF THE INVENTION

This invention relates generally to improvements in a vending control system and more particularly to a torque-limiting clutch assembly for a vending control system.

The use and operation of a torque-limiting clutch assembly in a vending control system is disclosed in U.S. Pat. No. 3,998,357. When an overload has occured and the torque-limiting clutch has allowed relative rotative movement between the motor cam and load cam, it is necessary when resetting the cam that the load cam be manually turned. It is therefore important to provide for as little friction and binding as possible between the motor cam and load cam to allow for manual turning of the load cam relative to the motor cam.

SUMMARY OF THE INVENTION

This torque-limiting clutch assembly for a vending control system facilitates manual resetting of the load cam relative to the motor cam be limiting the friction binding effect between the two cams. The present torque-limiting clutch means and switch assembly includes a motor for driving a load. A shaft is driven by the motor. A motor cam is connected to the shaft and has a cross-sectional rotative end bearing portion extending coaxially of the shaft. A load cam includes a recess for rotatively receiving the rotative end bearing portion of the motor cam and providing the only rotative bearing support for the motor cam and shaft on the load cam. A clutch spring is carried by and engages the motor cam for turning the load cam with the motor cam when the load torque on the load cam is less than a predetermined value, the clutch spring slidably engages the load cam when the torque is greater than the predetermined value for allowing relative rotative movement between the load cam and motor cam.

The motor cam includes an axially raised portion for actuating the switch assembly and an intermediate portion between the raised portion and rotative end bearing portion carrying the clutch spring. The load cam includes a cup-shaped section having an end wall in which the recess is located. The recess communicates with the cup-shaped section with the cup-shaped section of the load cam overfitting the motor cam. The motor cam intermediate section has a transverse dimension smaller than the transverse dimension of the cup-shaped section of the load cam to provide a peripheral space for allowing the aforesaid sections to overfit without physical engagement.

In one aspect of the invention, the bearing end portion of the motor cam snaps into the load cam recess.

In another aspect of the invention, the shaft extends axially through the motor cam and bearing portion and the end wall of the load cam. The use and operation of the vending control system is disclosed in U.S. Pat. No. 3,998,357.

DESCRIPTION OF THE PREFERRED EMBODIMENT

Figure 1:
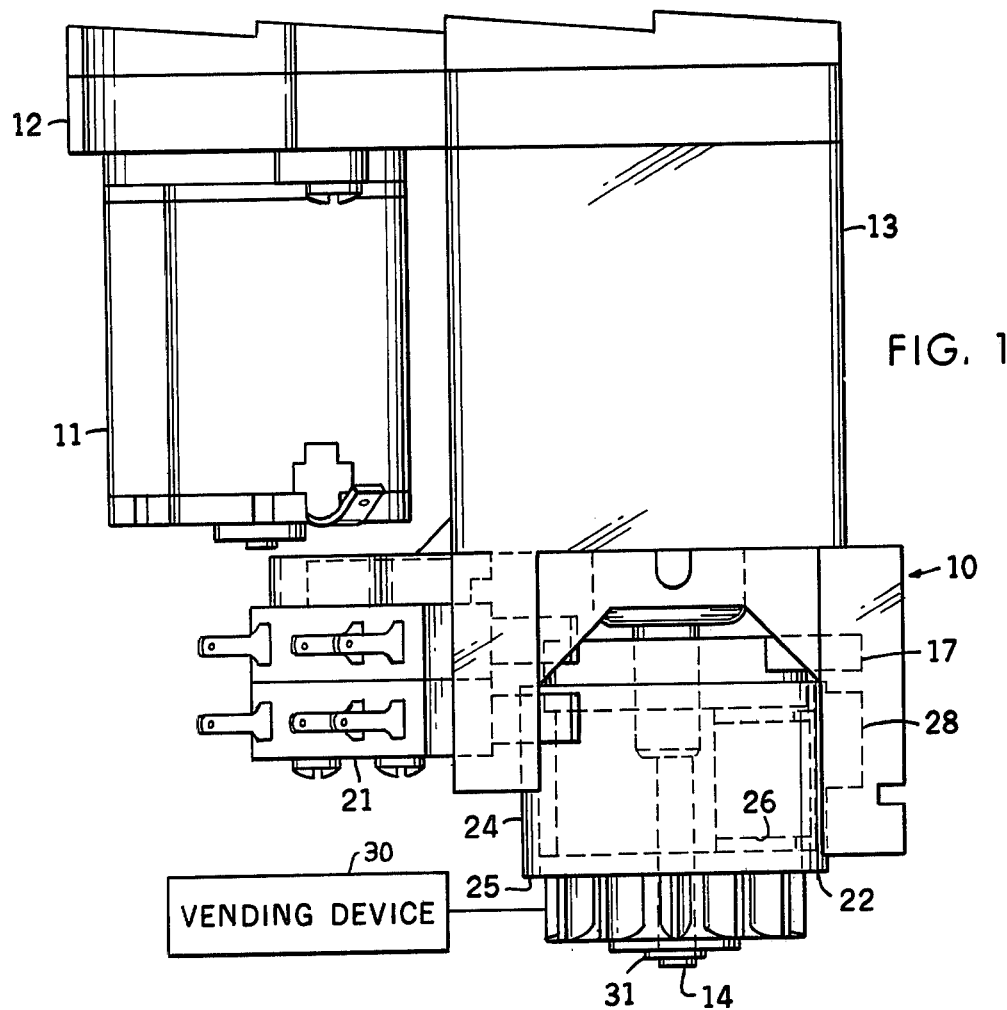
FIG. 1 is a top plane view of the vending control system.
Figure 2:
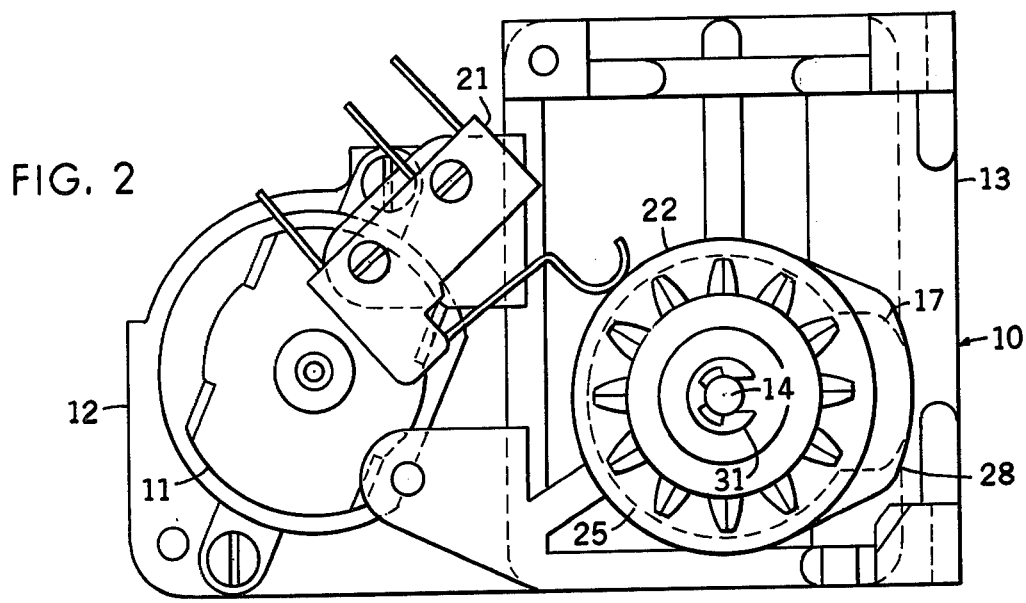
FIG. 2 is a front view of the vending control system.
Figure 4:
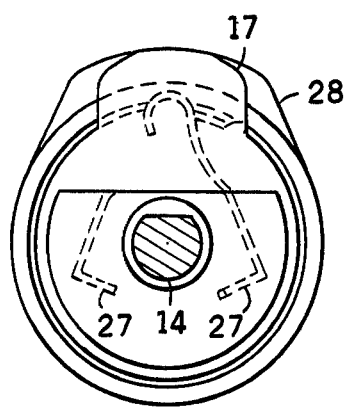
FIG. 4 is a sectional view taken on line 4—4 of FIG. 3.
Figure 3:
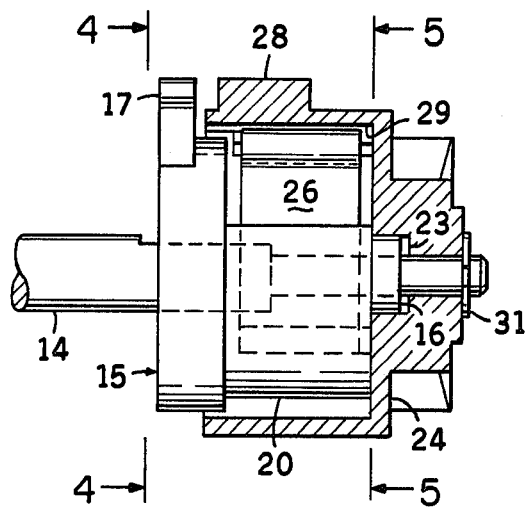
FIG. 3 is an enlarged side view of the torque-limiting clutch means shown partially in cross section.
Figure 5:
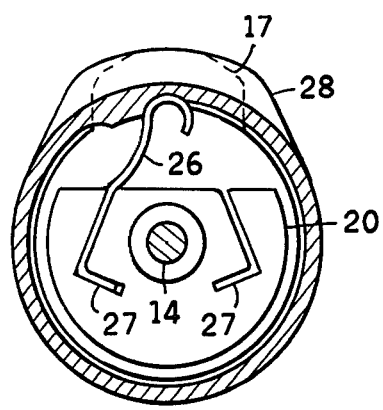
FIG. 5 is a sectional view taken on line 5—5 of FIG. 3.
Figure 6:
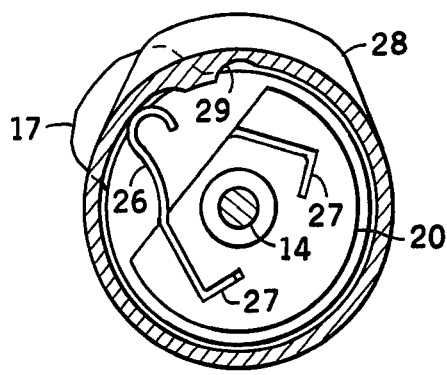
FIG. 6 is a view similar to FIG. 5 but showing the motor cam and load cam rotatively displaced.
Figure 7:
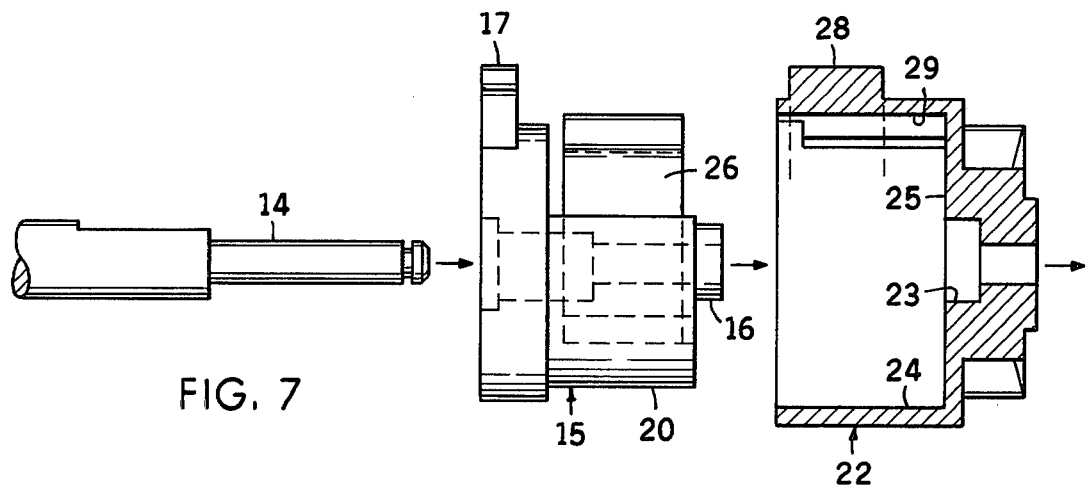
FIG. 7 is an exploded view of the torque-limiting clutch means.

Referring now by characters of reference to the drawings and first to FIGS. 1 and 7, the physical structure and arrangement of the vendind control system 10 will be described. The vending control system 10 includes a motor 11 secured to a motor mount 12 and operatively connected through a speed reducer 13 to shaft 14. A motor cam 15 is drivingly connected to and carried by the shaft 14. The motor cam 15 has a circular cross-sectional rotative end bearing 16 extending coaxially of the shaft 14. The motor cam 15 also includes an axially raised portion 17, and an intermediate portion 20 between the raised portion 17 and the rotative end bearing portion 16. A switch assembly 21 is actuated by the raised portion 17.

A load cam 22 includes a recess 23 for rotatively receiving the rotative end bearing portion 16, and providing the only rotative bearing support for the motor cam 15 and shaft 14 on the load cam 22. The load cam 22 includes a cup-shaped section 24 having an end wall 25. The recess 23 is located in the end wall 25 and communicates with the cup-shaped section 24. The cup-shaped section 24 of the load cam 22 overfits the motor cam 15. The load cam 24 includes an axially raised portion 28 for actuating the switch assembly 21.

A clutch spring 26 is carried by and engages the motor cam 15. The intermediate portion 20 of the motor cam 15 includes opposed slots 27 for selectively receiving the clutch spring 26 depending upon the desired direction of rotation of the shaft 14 and cams 15 and 22.

The load cam 22 is connected to a vending device 30, constituting a load, such as is disclosed in U.S. Pat. No. 3,998,357. The clutch spring 26 engages the load cam 22 at a groove 29 for turning the load cam 22 with the motor cam 15 when the load torque on the load cam 22 is less than a predetermined value. The clutch spring 26 effectively disengages from the grooves 29 and slidably engages the load cam 22 when the load torque is greater than the predetermined value for allowing relative rotative movement between the load cam 22 and the motor cam 15.

The transverse dimension of the intermediate portion 20 of the motor cam 15 is smaller than the transverse dimension of the cup-shaped section 24 of the load cam 22 to provide a peripheral space for allowing the intermediate portion 20 of the motor cam 15 and the cup-shaped section 24 of the load cam 22 to overfit without physical engagement, thereby removing the consideration of friction that makes it easier to reset the motor cam 15 and load cam 22 and facilitates the selection of the appropriate loading for the clutch spring 26 to effectuate disengagement of the spring 26 from the groove 29 and to determine the spring pressure on the load cam 22 upon rotative movement of the motor and load cams 15 and 22 respectively.

In the preferred embodiment, the bearing end portion 16 of the motor cam 15 snaps into the load cam recess 23 to provide the sole bearing support. The shaft 14 extends axially through the motor cam bearing end portion 16 and the end wall 25 of the load cam 22. A spring clip 31 retains the cam 15 and 22 on the shaft 14.

It is thought that the structural features and functional advantages of this torque-limiting clutch and switch assembly for a vending control system have become fully apparent from the foregoing description of parts, but for completeness of disclosure, the operation of the device will be briefly discussed. The application of the device in a vending machine is disclosed in U.S. Pat. No. 3,998,357 which is incorporated herein by reference.

The motor 11 drives the shaft 14 and motor cam 15 through the speed reducer 13. When the vending device 30 provides a load on the load cam 22 less than the predetermined value, the load cam 22 turns with the motor cam 15 and the raised portions 17 and 28 actuate the switch assembly 21. When the vending device 30 jams and the load on the load cam 22 is greater than the predetermined value, the load cam 22 is jammed and held stationary while the motor cam 15 will turn and actuate the switch assembly 21. The spring 26 will disengage from the groove and slidably engage the cup-shaped portion 24 of the load cam 22 allowing relative rotative movement between the motor and load cams 15 and 22.

After such an overload has occurred and the jam has been cleared, the load cam 22 can be manually reset by rotating the load cam 22 relative to the motor cam 15 until the spring 26 returns to the groove 29. Because the load cam 22 is carried by the bearing end portion 16 of the motor cam 15, and the cup-shaped portion 24 of the load cam 22 does not engage the periphery of the intermediate portion 20 of the motor cam 15, there is little friction between the two cams 15 and 22. By limiting the frictional contact between the cams 15 and 22, the load cam 22 can be manually reset easily, thereby facilitating resetting of the vending control system 10 after a jam has occurred.

I claim as my invention:

1. A torque-limiting clutch means and switch assembly for a vending control system including a motor for driving a load, comprising:

(a) a shaft driven by the motor,
(b) a motor cam connected to the shaft, the motor cam including:
  1. a first circular end portion providing a bearing extending coaxially of the shaft,
  2. a second opposite end portion, and
  3. an intermediate portion extending between the first and second end portions,
(c) a load cam including a cup-shaped section open at one end and closed at the other end by a wall, and having an annular spring-bearing wall extending axially between the open end and closed end wall, the end wall being provided with a recess communicating with the interior of the cup-shaped section and rotatively receiving the said first end portion of the motor cam and providing the only rotative bearing support for the motor cam and shaft on the load cam,
(d) the said second opposite end portion and the said intermediate portion of the motor cam being received in the cup-shaped section of the load cam, the said second opposite end portion and said intermediate portion of the motor cam having a transverse dimension smaller than the cup-shaped section of the load cam to provide a peripheral space therebetween without physical engagement,
(e) a clutch spring carried by the said intermediate portion of the motor cam and engaging the annular spring-bearing wall of the cup-shaped section of the load cam for turning the load cam with the motor cam when the load torque on the load cam is less than a predetermined value, and the clutch spring slidably engaging the annular spring-bearing wall of the cup-shaped section of the load cam when the load torque is greater than the predetermined value for allowing relative rotative movement between the load cam and the motor cam, and
(f) the second opposite end portion of the motor cam including a transverse raised portion for actuating the switch assembly, the transverse raised portion being located outside of and spaced from the open end of the cup-shaped section of the load cam.

* * * * *